United States Patent
Blenkush et al.

(10) Patent No.: US 9,140,397 B2
(45) Date of Patent: Sep. 22, 2015

(54) VALVE WEAR RING AND GATE VALVE WITH WEAR RING

(71) Applicant: DeZURIK, Inc., Sartell, MN (US)

(72) Inventors: Robert A. Blenkush, Sartell, MN (US); Sidney Watterodt, Cambridge (CA)

(73) Assignee: DeZURIK, Inc., Sartell, MN (US)

( * ) Notice: Subject to any disclaimer, the term of this patent is extended or adjusted under 35 U.S.C. 154(b) by 289 days.

(21) Appl. No.: 13/908,668

(22) Filed: Jun. 3, 2013

(65) Prior Publication Data

US 2013/0334453 A1 Dec. 19, 2013

Related U.S. Application Data

(60) Provisional application No. 61/654,942, filed on Jun. 3, 2012.

(51) Int. Cl.
*F16L 55/105* (2006.01)
*F16K 3/30* (2006.01)
*F16L 57/06* (2006.01)
*F16K 3/02* (2006.01)

(52) U.S. Cl.
CPC .............. *F16L 55/105* (2013.01); *F16K 3/0236* (2013.01); *F16K 3/0281* (2013.01); *F16K 3/30* (2013.01); *F16L 57/06* (2013.01)

(58) Field of Classification Search
CPC ....... F16L 55/105; F16L 57/06; F16K 3/0281; F16K 3/0236; F16K 1/42; F16K 3/30; F16K 3/20; F16K 3/0272
USPC ................. 251/326–329, 359–360, 362–363; 137/375
See application file for complete search history.

(56) References Cited

U.S. PATENT DOCUMENTS

| | | | | | |
|---|---|---|---|---|---|
| 4,264,054 | A | * | 4/1981 | Morrill | 251/328 |
| 4,519,582 | A | * | 5/1985 | Freeman | 251/328 |
| 4,543,981 | A | * | 10/1985 | Bates et al. | 137/315.3 |
| 4,568,062 | A | * | 2/1986 | Regitz et al. | 251/328 |
| 4,577,834 | A | * | 3/1986 | Oliver | 251/175 |
| 5,211,373 | A | * | 5/1993 | Baker | 251/196 |
| 5,727,775 | A | * | 3/1998 | Rodger et al. | 251/328 |
| 5,876,015 | A | * | 3/1999 | Schaeffer et al. | 251/305 |
| 5,975,039 | A | | 11/1999 | Oshige | |
| 6,226,866 | B1 | | 5/2001 | Wilson et al. | |
| 6,234,194 | B1 | | 5/2001 | Jainek et al. | |
| 8,006,715 | B2 | | 8/2011 | Shafer et al. | |

* cited by examiner

*Primary Examiner* — John Bastianelli
(74) *Attorney, Agent, or Firm* — Pauly, DeVries Smith & Deffner, LLC

(57) ABSTRACT

Valves having removable interior wear rings in which the wear ring comprises a high-hardness metal ring, the high hardness metal ring having an exterior surface configured to engage the body of gate valve. A polymeric overlay covers at least a portion of the exterior surface of the metal ring, the polymeric overlay forming the final dimensional shape of the wear ring.

17 Claims, 8 Drawing Sheets

SECTION A-A

VALVE WEAR RING AND GATE VALVE WITH WEAR RING

This application claims the benefit of U.S. Provisional Application No. 61/654,942, filed Jun. 3, 2012, the contents of which are herein incorporated by reference.

FIELD OF THE INVENTION

The present invention is directed to improved wear rings for use in valves, and to methods and materials for producing the improved wear rings. In particular, the invention is directed to improved wear rings for use in gate valve assemblies.

BACKGROUND OF THE INVENTION

Large gate valves are commonly used in a wide range of applications, including mining, manufacturing, refining, sewer and water, and many others. In many of these applications, such as the use of large gate valves in the transportation of water, the valves can remain in use for many years, and even decades, with relatively little significant maintenance or service. However, many other large gate valves are used in extremely challenging environments where the interior surfaces of the valve components are exposed to abrasive or corrosive materials that can rapidly degrade all but the most durable of materials. For example, carrying of mining slurries with significant amounts of rock and sand can wear away interior valve components prematurely. Similarly, tar sands, such as those mined in western Canada to make alternative fuels, are processed at elevated temperatures and with very high solids contents that readily degrade the interior of valves as they pass through.

In order to promote longer service life of valves, especially large gate valves that operate in extreme conditions, it is possible to create replaceable surfaces that line portions of the inside of the valves. These replaceable surfaces can be made of much harder materials than the other valve components—in part because they require less elaborate machining than other parts, and also because they can use higher priced metals without requiring use of expensive materials throughout the valve. In addition, the removable nature of the surfaces allows them to be replaced without replacing or rebuilding the entire valve.

Unfortunately, one challenge of existing gate valve designs, even those that use replaceable wear resistant surfaces, is that materials used to make these wear resistant surfaces are often so hard that they can be difficult to machine to fine tolerances. Of particular difficulty in machining are curved surfaces, such as the outer diameter of wear rings that are designed to tightly fit into a valve body. However, in order to fit properly within the valve body the wear rings must have relatively precise external shape and dimensions. It is possible to machine such dimensions, but the time and expense of satisfactory machining of such surfaces can be exceedingly high due to the hard nature of the materials necessary to have suitable wear properties. In addition, the extremely hard alloys used for such wear surfaces are also often quite brittle, and can crack under the machining stresses. Therefore, a need exists for improved wear surfaces for use within valves, in particular improved wear rings that can be formed without excessive machining

SUMMARY OF THE INVENTION

The present application is directed, in part, to wear rings for insertion into gate valves, along with gate valves containing such wear rings. In an example embodiment the wear ring comprise a high-hardness metal ring, the high hardness metal ring having a polymeric exterior layer that fits tightly into a receiving area in the body of a gate valve. The polymeric material forms the final dimensional shape of the exterior of the wear ring, which avoids the need to machine the metal wear ring to final tolerances. The wear rings are typically circular or substantially circular in shape. Although less desirable, it is possible to have the wear rings formed of two or more segments (such that each segment is half a circle, for example). The wear rings are typically formed of a very hard metal, such as white iron or Ni-hard, which is an extremely hard alloy.

As noted above, typically the high-hardness metal ring is a cast material and the exterior surface of the high-hardness metal ring is not substantially machined because machining extremely hard materials, such as the thin wear rings, can be very difficult. The rings are typically in the range of one half to six inches wide, but have a thickness of about one half to one inch in most embodiments. These rings, often being relatively thin, do not easily machine, especially the exterior and interior curved surfaces (the planar flat surfaces can be ground into planes much easier). Applying a polymeric over layer, typically by casting, allows for creation of a suitably precise exterior dimension to the wear ring. The polymeric over layer also provides the optional benefit of sealing functionality, such as by integrating an o-ring type surface.

Thus, in typical implementations circumferential exterior surfaces of the high-hardness metal ring are not substantially machined. Instead, in order to produce a wear ring that will have a relatively precise external shape and dimensions, a polymeric material is molded as an overlay to the wear ring. The polymeric material, such as a polyurethane, provides the final precise dimensions of the exterior of the wear ring, thereby avoiding the need for significant levels of machining Also, the polymeric material can provide for formation of integrated sealing features, such as o-ring functionality.

The interior surfaces of the wear ring, which are those most exposed to abrasion and wear because they are directly exposed to fluids and moving solids within the valve, are generally not machined for the same reason that exterior surfaces are not machined—to avoid the time and cost, but also to avoid unintentionally cracking the seal ring. The front and back surfaces of the wear ring can often be ground to a planar or substantially planar finish.

In some implementations the exterior surface configured to engage the body of the gate valve has two diameters separated by a planar edge or shoulder designed to engage a corresponding edge in the valve body. In such implementations the wear ring has a first portion with a first circumference, and second portion offset from the first portion so as to have a larger circumference, each of the first and second portions being overlain with a polymeric overlay. It is possible to have just one of said portions overlain with the polymeric material, although this is less common.

The polymeric material is often from 1 to 10 mm thick, often from 2 to 6 mm thick. Generally the polymeric material is significantly thinner than the metal portion of the ring: Generally less than 20 percent of the thickness of the ring, often from 5 to 25 percent, optionally from 5 to 20 percent.

In an example implementation the gate valve includes a retainer ring on at least one side of the valve, the retainer ring configured to secure the wear rings in place with a combination of compressive and shear forces.

The above summary of the present invention is not intended to describe each discussed embodiment of the present invention. This is the purpose of the figures and the detailed description that follows.

BRIEF DESCRIPTION OF THE DRAWINGS

The invention may be more completely understood and appreciated in consideration of the following detailed description of various embodiments of the invention in connection with the accompanying examples reflected in the drawings.

Figure 1:
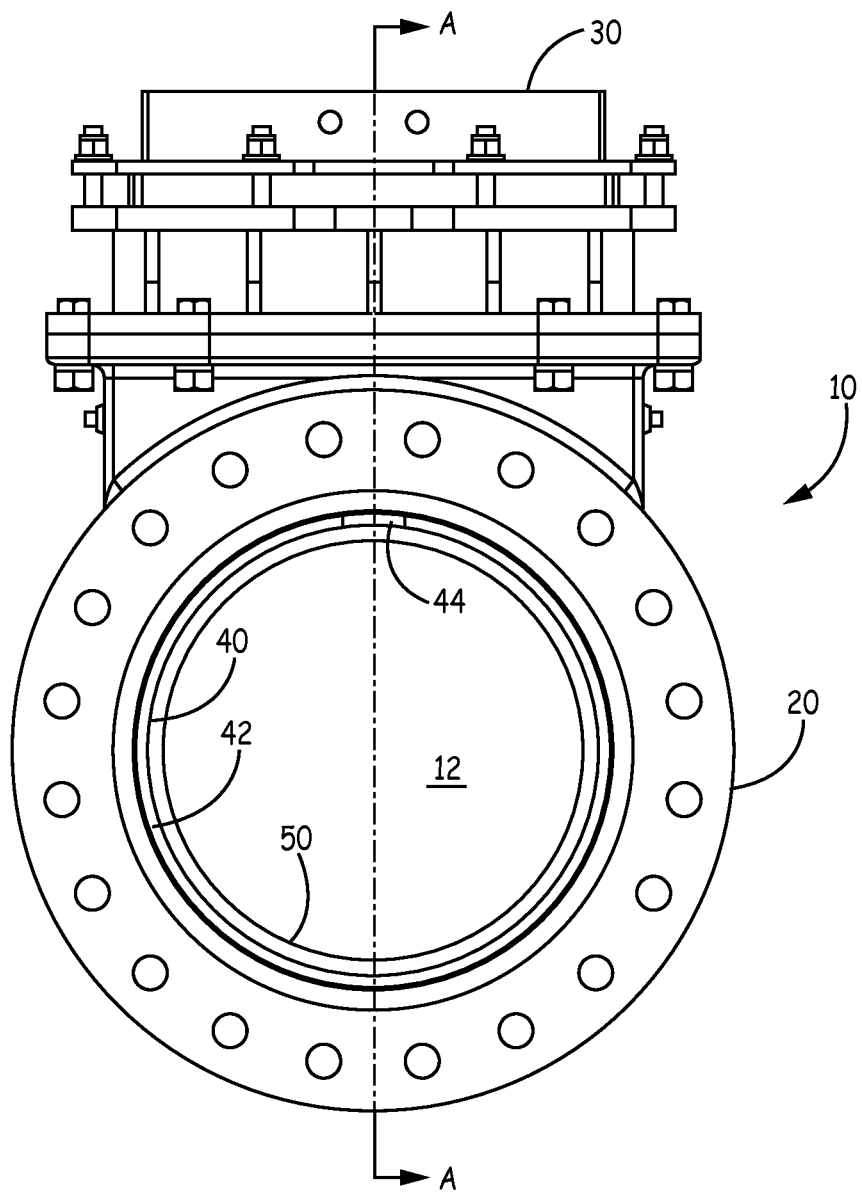
FIG. 1 is an end view of a gate valve constructed in accordance with an implementation of the invention.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION

The present application is directed, in part, to wear rings for insertion into gate valves, along with gate valves containing such wear rings. In an example implementation, the gate valve comprises a valve body comprising a first opening, a second opening and an interior. A gate is configured to move into and out of the interior of the valve body so as to substantially prevent the flow of liquids through the valve when the gate is inserted into the interior of the valve body.

First and second wear rings are positioned within the valve body, the wear rings positioned on either side of the path of the gate so as to partially line the interior of the valve body. A retaining ring for securing the first wear ring in the valve body can extend around at least a portion of a first opening of the valve to hold the wear rings in place. The wear rings comprise a high-hardness metal ring, the high hardness metal ring having an exterior surface that fits tightly into a receiving area in the body of a gate valve.

The wear rings are typically circular or substantially circular in shape. Although less desirable, it is possible to have the wear rings formed of two or more segments (such that each segment is half a circle, for example). The wear rings are typically formed of a very hard metal, such as white iron or Ni-hard. The exterior surface of the wear rings has a polymeric material covering at least a portion of the exterior surface of the metal ring, the polymeric material forming the final dimensional shape of the wear ring.

Typically the high-hardness metal ring is a cast material and the exterior surface of the high-hardness metal ring is not substantially machined because machining extremely hard materials, such as the thin wear rings, can be very difficult. The wear rings are typically in the range of one half to six inches wide, but have a thickness of about one half to one inch in most embodiments. These wear rings, often being relatively thin, do not easily machine, especially the exterior and interior curved surface (the planar flat surfaces can be ground into planes much easier). Thus, in some implementations circumferential exterior surfaces of the high-hardness metal ring are not substantially machined. Instead, in order to produce a wear ring that will have a relatively precise external shape and dimensions, the polymeric material is molded as an overlay to the wear ring. The polymeric material, such as a polyurethane, provides the final dimensions of the exterior of the wear ring, thereby avoiding the need for significant levels of machining Also, the polymeric material can provide for formation of integrated sealing features, such as o-ring functionality.

The interior surfaces of the wear ring, which are those most exposed to abrasion and wear because they are directly exposed to fluids and moving solids within the valve, are generally not machined for the same reason that exterior surfaces are not machined. The front and back surfaces of the wear ring can often be ground to a planar or substantially planar finish.

In some implementations the exterior surface of the wear ring that is configured to engage the body of the gate valve has two diameters separated by a planar edge or shoulder designed to engage a corresponding edge in the valve body. In such implementations the wear ring has a first portion with a first circumference, and second portion offset from the first portion so as to have a larger circumference, each of the first and second portions being overlain with a polymeric overlay. It is possible to have just one of said portions overlain with the polymeric material, although this is less preferred.

The polymeric material is often from 1 to 10 mm thick, optionally from 2 to 6 mm thick. Generally the polymeric material is significantly thinner than the metal portion of the ring: Generally less than 20 percent of the thickness of the ring, often from 5 to 25 percent, optionally from 5 to 20 percent.

Referring now to the drawings, FIG. 1 is an end view of a gate valve 10 constructed in accordance with an implementation of the invention, the gate valve 10 having a body 20. The gate valve 10 includes a first opening 12 which leads into an interior volume and out the back side of the valve through a second opening (not shown). A gate 30 is insertable into the interior volume of the body 20 of the valve 10, the gate 30 serving to prevent or regulate the flow of fluids through the valve.

Also shown in FIG. 1 is an exposed portion of a wear ring 50, held in place by a retainer ring 40. The retainer ring 40 depicted in the present embodiment is formed in two parts: a first retainer ring portion 42 extending around nearly the entirety of the first opening 12, plus a small keystone retainer ring portion 44 which completes a small portion of the ring. The purpose of the keystone retainer ring portion 44 is to allow the first retainer ring portion 42 to be installed, and then to subsequently install the keystone portion. The keystone retainer ring portion 44 is shown at the top of the first opening 12 in FIG. 1; other locations for the keystone retainer ring 44 are possible around the first opening 12.

Figure 2:
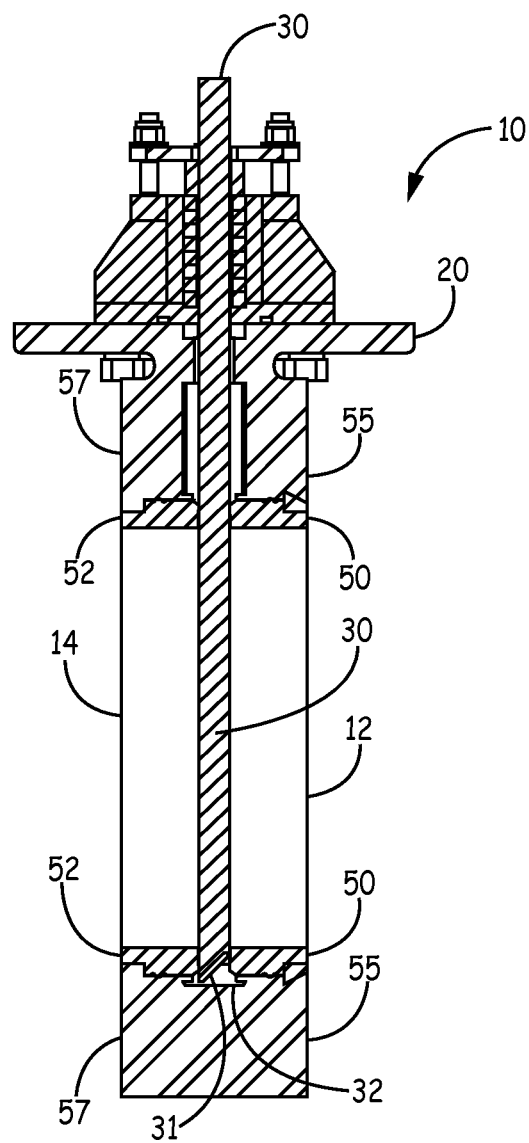
FIG. 2 is a side cross-sectional view of the gate valve of FIG. 1, showing internal components of the valve.
Figure 3A:
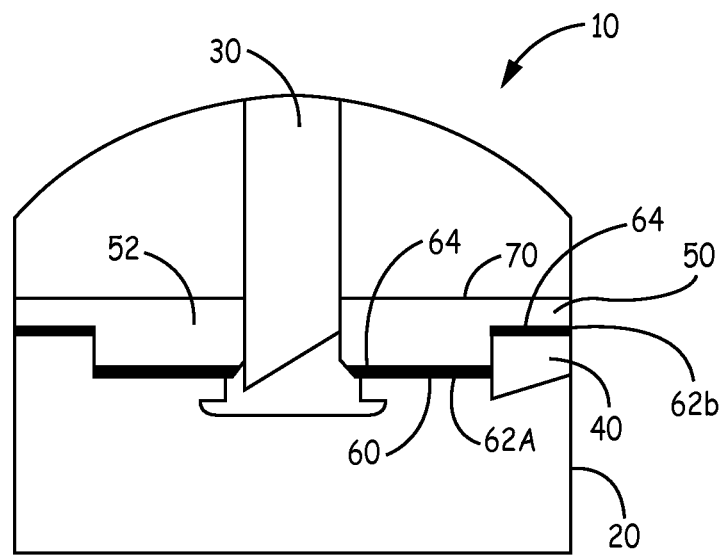
FIG. 3A is a partial side cross-sectional view of the gate valve of FIG. 1, showing a close-up of the bottom of the gate valve, with two wear rings installed.
Figure 3B:
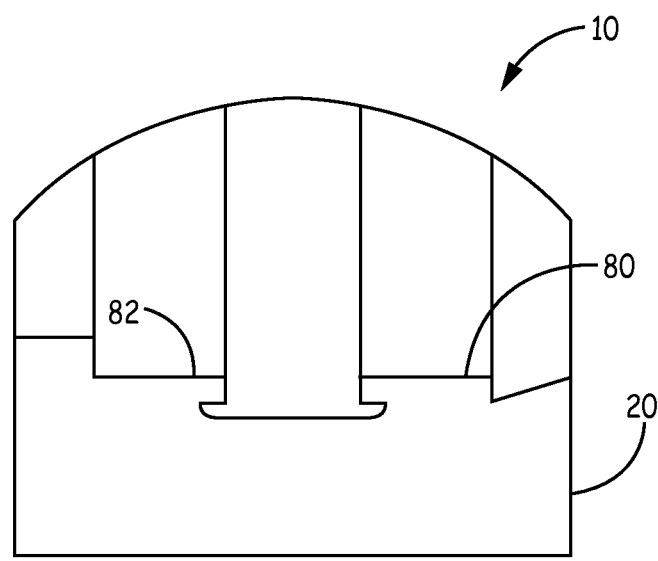
FIG. 3B is a partial side cross-sectional view of the gate valve of FIG. 1, showing a close-up of the bottom of the gate valve, wear rings removed.
Figure 4:
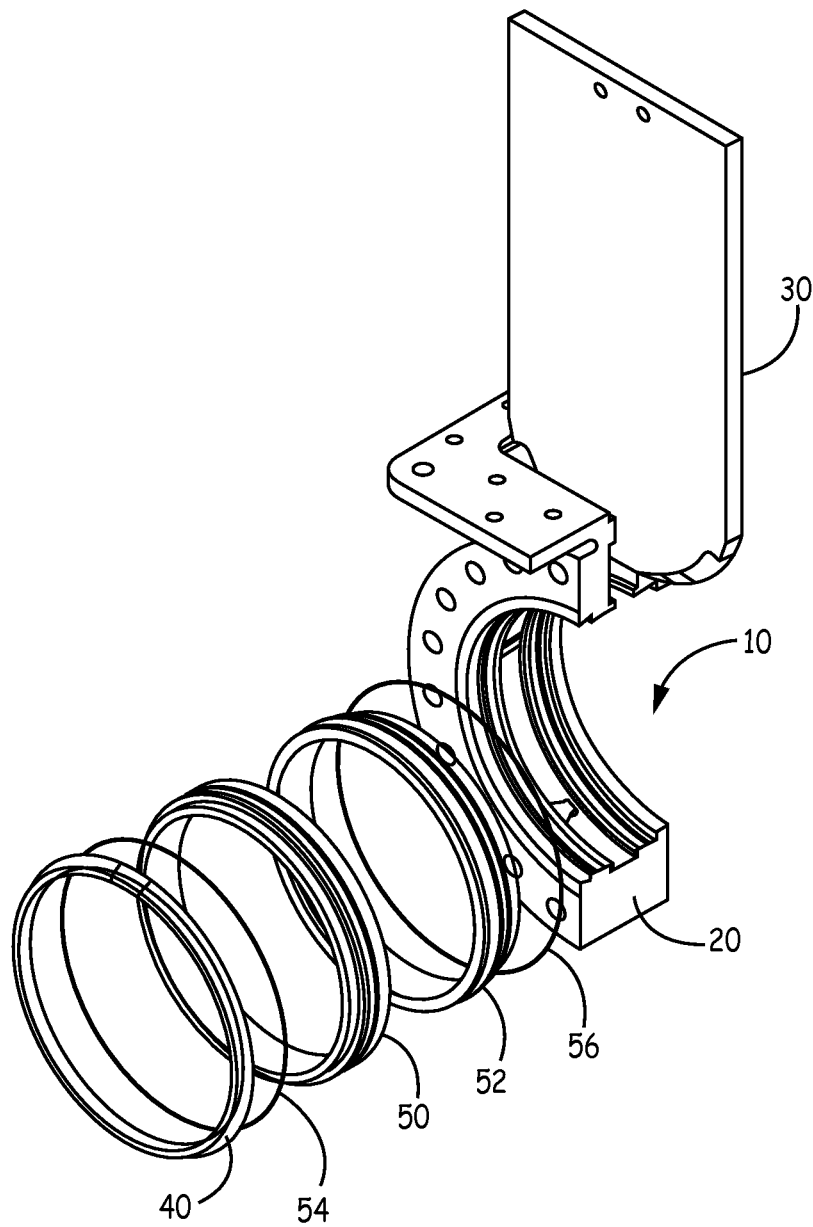
FIG. 4 is an exploded partial perspective view of the gate valve of FIG. 1, showing the gate valve body, the gate valve, a pair of wear rings, and mounting hardware for mounting the wear rings.

Features of the valve 10 are shown in further detail in FIG. 2, FIG. 3, and FIG. 4. First, FIG. 2 is a side cross-sectional view of the gate valve of FIG. 1 taken along cross section A-A of FIG. 1, and showing internal components of the valve 10. Gate 30 is shown inserted into a pathway or channel in the valve body 20 of the valve 10. On one side (the right, as depicted in FIG. 2), a cross section of a first wear ring 50 is shown. The front of the first wear ring 50 is flush with a front surface 55 of the valve body 20. The back of the first wear ring 50 is flush with the gate 30 (or gate channel or path when the gate is removed). The first wear ring substantially encircles and forms the first opening 12 of the valve 10. On the second side (the left, as depicted in FIG. 2), a cross section of the second wear ring 52 is shown. The front of the second wear ring 52 is flush with a back surface 57 of the valve body 20. The second wear ring substantially encircles and forms the second opening 14 to the valve 10. It will be observed that the majority of the interior of the body 20 of the valve 10 is covered by the wear rings 50, 52. In particular, the surfaces that would be most exposed to abrasive wear (such as from slurries) are protected by the wear rings. Removal and replacement of these wear rings allows for extended life of the valve without replacement of the entire valve. Also shown in FIG. 2 is a recess 32 in the valve body 20, the recess for receiving the tip 31 of the gate 30 when the gate 30 is inserted fully into the body 20 of the valve 10.

FIG. 3A is a partial side cross-sectional view of the gate valve of FIG. 1, showing a close-up of the bottom of the gate valve 20, with two wear rings 50, 52 installed. FIG. 3B is a partial side cross-sectional view of the gate valve 20 of FIG. 1, showing a close-up of the bottom 20 of the gate valve 20, wear rings removed. In FIG. 3A the first wear ring 50 is held in place by a retainer ring 40. The first wear ring 50 has an inner surface 70 and an outer surface 60 (the outer surface 60 having a first portion 62a and second portion 62b). These surface portions 62a and 62b are typically not machined. A softer material, such as a polymeric material, provides overlays 64. The polymeric overlays 64 provide final dimensional shape to the outer surface of the wear ring 50, allowing the wear ring 50 to fit tightly in a receiving area 80 (shown in FIG. 3B, along with receiving area 82 for wear ring 52) of the valve body 20 without requiring machining of the exterior surfaces of the wear ring 50. Similarly, in the embodiment shown, a wear ring 52 on the opposite side of the body 20 is present.

FIG. 4 is an exploded partial perspective view of the gate valve 10 of FIG. 1, showing the valve body 20, the gate 30, a pair of wear rings 50 and 52, and a retainer ring 40 for securing the two wear rings 50, 52 in place. Two optional o-rings 54, 56 are also shown. The o-rings 54, 56 are optional in that alternative seal arrangements can be used rather than these o-rings.

Figure 5:
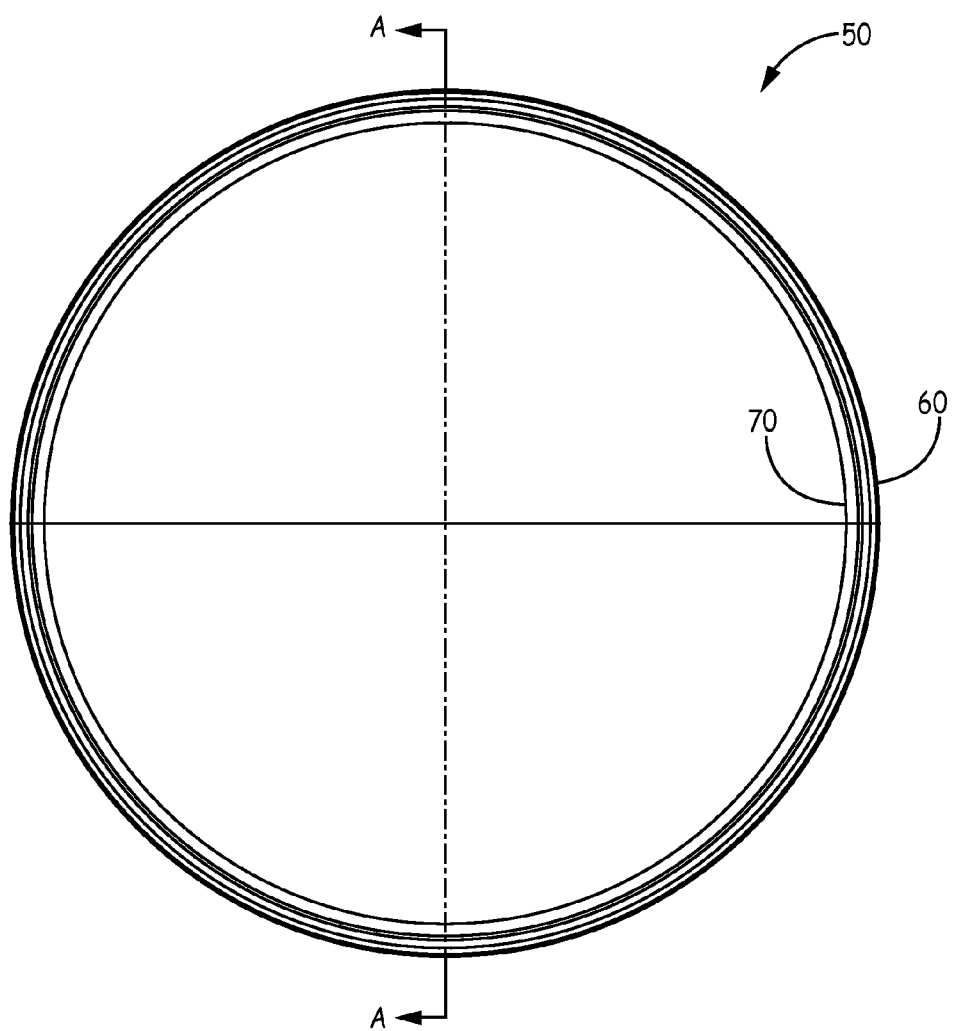
FIG. 5 is top planar view of a wear ring made in accordance with an implementation of the invention.

FIG. 5 is top planar view of a wear ring 50 made in accordance with an implementation of the invention. The wear ring 50 includes an outer surface 60 and an inner surface 70. Outer surface 60 includes a polymeric layer (not shown). The wear ring 50 can vary in size, but is typically scaled up for larger valves, and scaled down for smaller valves. A typical thickness (measured from surface 60 to surface 70) will be approximately of half an inch, although the wear ring can be thinner or thicker depending upon the implementation.

Figure 6:
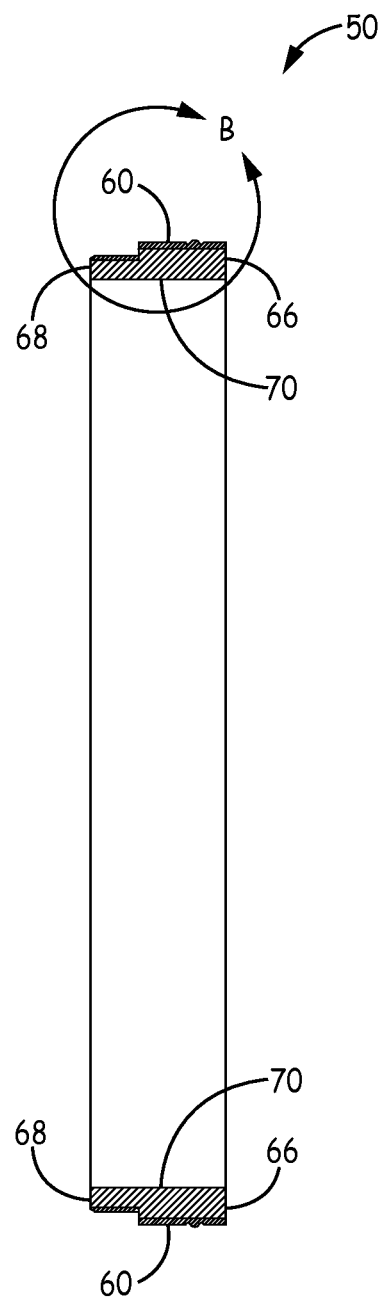
FIG. 6 is a side cross cross-sectional view of the wear ring of FIG. 5.

FIG. 6 is a side cross cross-sectional view of the wear ring of FIG. 5, taken along section A-A. FIG. 6 shows the outer surface 60 and inner surface 70, along with a first face 66 and a second face 68 of the wear ring. Polymeric material is also shown overlying the outer surface 60.

Figure 7A:
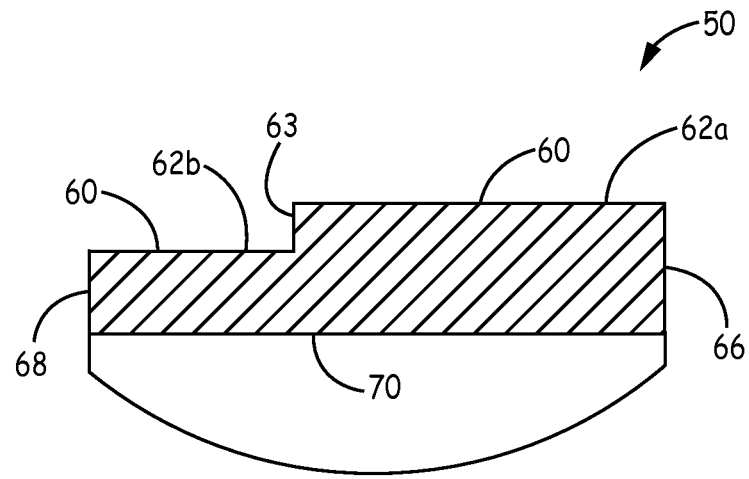
FIG. 7A is a cross section of a first wear ring made in accordance with the present invention, prior to application of overlay material.
Figure 7B:
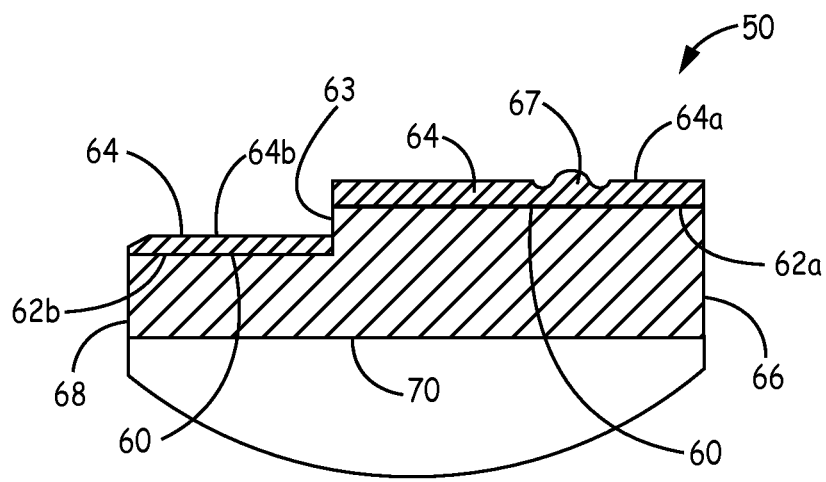
FIG. 7B is a cross-section of a first wear ring made in accordance with the present invention, after application of overlay material.

FIGS. 7A and 7B show further features of an example wear ring. FIGS. 7A and 7B show a portion of a wear ring, such as the portion within circle B in FIG. 6. FIG. 7A is a cross section of a first wear ring 50 made in accordance with the present invention, prior to application of overlay material; and FIG. 7B is a cross-section of the first wear ring 50 after application of overlay material 64. In FIG. 7A the wear ring 50 includes inner surface 70, along with outer surface 60 prior to application of an overlay material. It will also be observed that the wear ring 50 includes first face 66 and second face 68. The outer surface 60 as depicted includes a first circumferential portion 62a and a second circumferential portion 62b, separated by a shoulder 63. The first and second circumferential portions 62a and 62b are generally not machined. The shoulder 63, which can engage a flange or retainer ring, will optionally be a machined surface. FIG. 7B shows the wear ring 50 after a polymeric material 64 has been applied to at least a part of the outer surface 60 of the wear ring 50. The polymeric material 64 is, for example, a polyurethane. The polymeric material 64 is deposited in two areas in the disclosed embodiment: 64a overlying surface 62a, and 64b overlying surface 62b. No polymeric material is shown overlying the shoulder 63, although in some implementations a polymeric material is applied to the shoulder 63.

FIG. 7b also shows the polymeric material 64 comprising a seal portion 67. The seal portion 67 can be located on the surface of the polymeric material 64 that will be in contact with the valve body 20. The seal portion 67 can be a portion of the polymeric material 64 that is inconsistent with the remainder of the polymeric material 64. The seal portion 67 can help restrict the flow of liquid between the polymeric material 64 and the valve body 20, similar to an o-ring. The seal portion 67 can have a sinusoidal shape. The seal portion 67 can comprise a portion of a circle, such as a half of a circle.

Figure 8A:
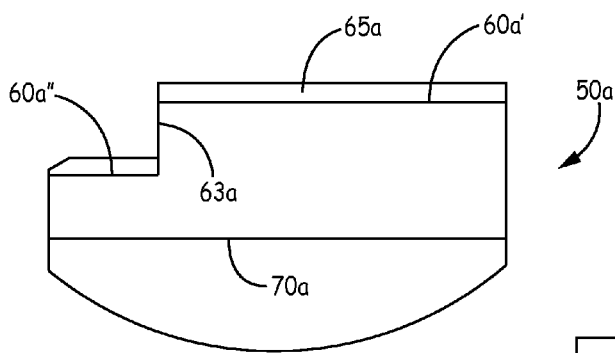
FIG. 8A is a cross section of second wear ring made in accordance with the present invention.
Figure 8B:
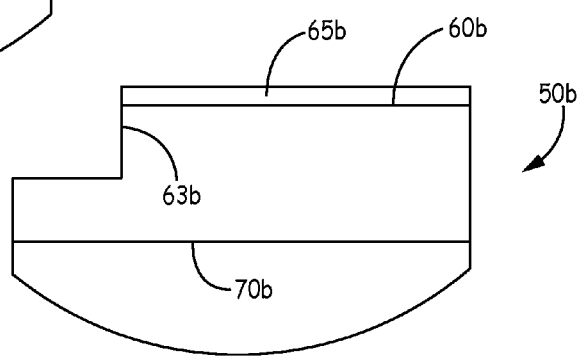
FIG. 8B is a cross section of second wear ring made in accordance with the present invention.
Figure 8C:
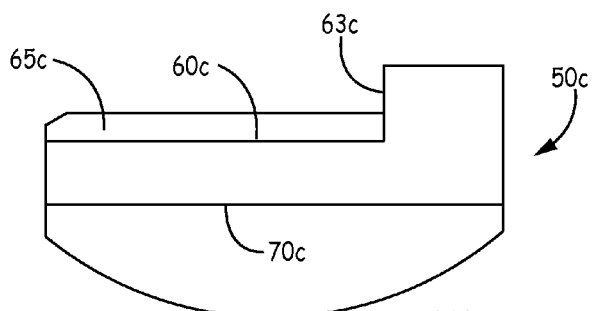
FIG. 8C is a cross section of second wear ring made in accordance with the present invention.
Figure 8D:
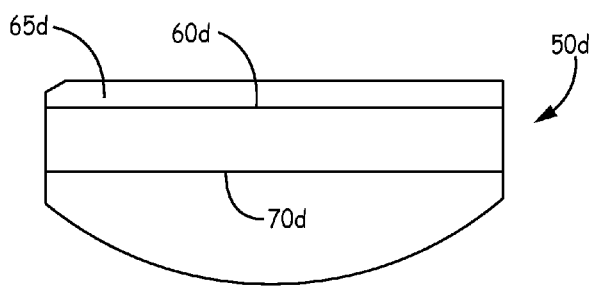
FIG. 8D is a cross section of second wear ring made in accordance with the present invention.

Now in reference to FIGS. 8A to 8D, alternative configurations are shown for the external surface of various wear rings made in accordance with implementations of the invention. FIG. 8A is a cross section of a wear ring made in accordance with the present invention, wherein the circumferential portions 60a' and 60a" are similar to those shown in FIG. 7, but one circumferential portion is much larger than the other. FIG. 8B is a cross section of similar wear ring made in accordance with the present invention, with only one of the external circumferential portions (such as portion 60b) having a polymeric layer. This configuration is less desirable than that shown in FIG. 8A (or FIG. 7), but can work in some embodiments. FIG. 8C shows another design wherein only one of the external circumferential portions (such as 60c), but this time the one with the bigger diameter, has the polymeric layer. Again, this design is less desirable than designs with all circumferential portions containing the polymeric layer, but it can work in some embodiments. FIG. 8D is a cross section of second wear ring made in accordance with the present invention wherein the polymeric portion 65d covers the whole outer surface 60d of the wear ring 50D. It will be understood that various other configurations are also possible besides those shown in FIG. 8A to 8D, including those with more or fewer different diameters for the circumferential portions, and with no shoulder All publications and patent applications in this specification are indicative of the level of ordinary skill in the art to which this invention pertains. All publications and patent applications are herein incorporated by reference to the same extent as if each individual publication or patent application was specifically and individually indicated by reference.

It will be appreciated that, although the implementation of the invention described above is directed to a hard drive enclosure, the present device may be used with other electronic enclosures, and is not limited to hard drive enclosures. In addition, while the present invention has been described with reference to several particular implementations, those skilled in the art will recognize that many changes may be made hereto without departing from the spirit and scope of the present invention.

We claim:

1. A gate valve and a substantially circular wear ring for insertion into the gate valve comprising a gate valve having a body,
   a substantially circular wear ring comprising:
   a high-hardness metal ring, the high hardness metal ring having an exterior surface configured to engage the body of the gate valve;
   a polymeric overlay covering at least a majority of the exterior surface of the metal ring, the polymeric overlay forming the final dimensional shape of the wear ring and configured to fit an interior surface of the body of the gate valve;
   wherein the metal ring has a first portion with a first circumference, and a second portion offset from the first portion so as to have a larger circumference, each of the first and second portions being overlain with the polymeric overlay; and
   wherein the offset between the first portion and second portion of the circular wear ring is at least partially exposed.

2. The substantially circular wear ring of claim 1, wherein high-hardness metal ring is a cast material and the exterior surface of the high-hardness metal ring is not substantially machined.

3. The substantially circular wear ring of claim 1, wherein the high-hardness metal ring is a cast material and circumferential exterior surfaces of the high-hardness metal ring are not substantially machined.

4. The substantially circular wear ring of claim 1, wherein the exterior surface configured to engage the body of the gate valve has two diameters.

5. The substantially circular wear ring of claim 4, wherein the two diameters are separated by a planar edge.

6. The substantially circular wear ring of claim 1, wherein the wear ring further comprises a front surface and a back surface, the front and back surfaces being substantially planar.

7. The substantially circular wear ring of claim 1, wherein the wear ring further comprises a front surface and a back surface, the front and back surfaces being substantially planar, the front and back surfaces having a machined surface finish.

8. The substantially circular wear ring of claim 1, wherein the inner surface of the high hardness metal ring comprises a substantially non-machined surface.

9. The substantially circular wear ring of claim 1, wherein the first portion of the offset between the first portion and second portion of the circular wear ring is at least partially covered by the polymeric material.

10. The substantially circular wear ring of claim 1, wherein the polymeric material is formed by casting.

11. The substantially circular wear ring of claim 1, wherein the polymeric material is from 2 to 10 mm thick.

12. The substantially circular wear ring of claim 1, wherein the polymeric material is from 3 to 8 mm thick.

13. A gate valve and a substantially circular wear ring for insertion into the gate valve comprising a gate valve having a body,
    a substantially circular wear ring comprising:
    a metal ring configured for insertion into the gate valve, the metal ring having an exterior surface configured to engage the body of the gate valve and an interior surface;
    a polymeric overlay covering at least a majority of the exterior surface of the metal ring, the overlay forming the final dimensional shape of the wear ring and configured to fit an interior surface of the body of the gate valve;
    wherein the metal ring has a first portion with a first circumference, and a second portion offset from the first portion so as to have a larger circumference, each of the first and second portions being overlain with the polymeric overlay; and
    wherein the offset between the first portion and second portion of the circular wear ring is at least partially exposed.

14. The substantially circular wear ring of claim 13, wherein metal ring is a cast material and the exterior surface of the high-hardness metal ring is not substantially machined.

15. The substantially circular wear ring of claim 13, wherein high-hardness metal ring is a cast material and circumferential exterior surfaces of the high-hardness metal ring are not substantially machined.

16. The substantially circular wear ring of claim 13, wherein the wear ring further comprises a front surface and a back surface, the front and back surfaces being substantially planar, the front and back surfaces having a machined surface finish.

17. A gate valve, the gate valve comprising:
    a valve body comprising a first opening, a second opening and an interior, wherein a gate is configured to move into and out of the interior of the valve body so as to substantially prevent a flow of liquids through the valve body when the gate is inserted into the interior of the valve body;
    first and second metal wear rings inserted within the valve body, the wear metal rings positioned on either side of the path of the gate so as to partially line the interior of the valve body, the wear rings comprising a polymeric overlay covering at least a majority of the exterior surface of the metal ring, the polymeric overlay forming the final dimensional shape of the wear rings;
    wherein the metal ring has a first portion with a first circumference, and a second portion offset from the first portion so as to have a larger circumference, each of the first and second portions being overlain with the polymeric overlay; and
    wherein the offset between the first portion and second portion of the circular wear ring is at least partially exposed.

* * * * *